Sept. 17, 1963   R. S. ZEBARTH ET AL   3,103,695
SPRING-LOADED LIFTER PLATE FOR SHACKLE UNLOADERS
Filed May 22, 1961   2 Sheets-Sheet 1
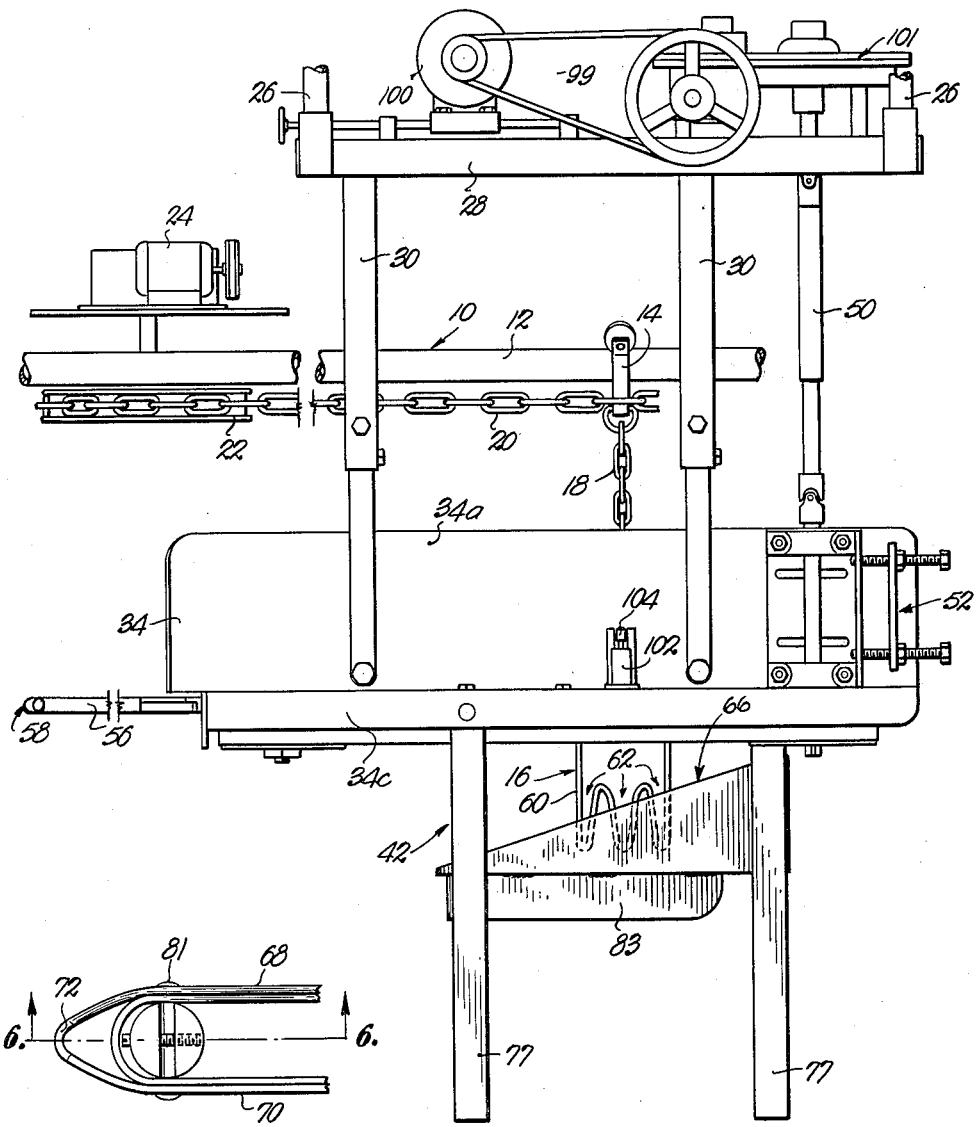
Fig. 1.
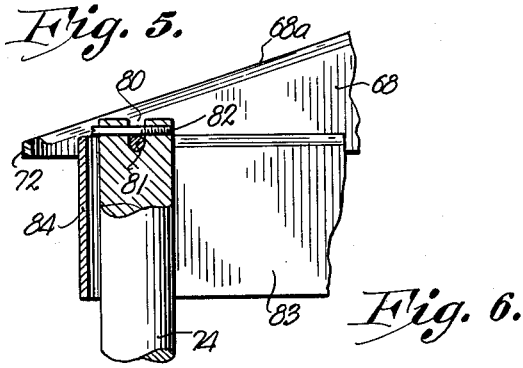
Fig. 5.
Fig. 6.
INVENTORS.
Ralph S. Zebarth
Robert D. Crawford
BY
Hovey, Schmitt, Johnson & Hovey
ATTORNEYS.

Sept. 17, 1963     R. S. ZEBARTH ET AL     3,103,695
SPRING-LOADED LIFTER PLATE FOR SHACKLE UNLOADERS
Filed May 22, 1961     2 Sheets-Sheet 2

INVENTORS.
Ralph S. Zebarth
Robert D. Crawford
BY
Hovey, Schmidt, Johnson & Hovey
ATTORNEYS.

United States Patent Office 3,103,695
Patented Sept. 17, 1963

3,103,695
SPRING-LOADED LIFTER PLATE FOR
SHACKLE UNLOADERS
Ralph S. Zebarth, Kansas City, and Robert D. Crawford, Parkville, Mo., assignors to Gordon Johnson Company, Kansas City, Mo., a corporation of Missouri
Filed May 22, 1961, Ser. No. 111,828
8 Claims. (Cl. 17—11)

This invention relates to an automatic bird take-off machine for use in poultry processing plants wherein, during the many operations for preparing poultry for market, including scalding, feather removal, evisceration, and a multitude of additional steps, the birds are individually suspended from a shackle.

The present invention has a swingable lifter engageable with the bird carried by a moving shackle for lifting the bird out of the shackle. The lifter is normally positioned adjacent the path of travel of the shackle and disposed to pivot out of the path of the shackle should the latter, for any reason, move out of its normal path of travel. Thus, the present invention permits shackle to pass the lifter without damage to the shackle by bending.

It is the primary object of this invention to provide a channeled, deflectable, lifting device for automatically removing a bird from a shackle as the latter is moved by a conveyor system past the device so that the shackle is not damaged should the latter fail to follow a predetermined path through the channel under the influence of the conveyor system.

Another object of the present invention is the provision of a lifting device comprising a pair of pivotally mounted, spaced plates each having an inclined, bird-engaging edge for removing a bird from a shackle passing between the plates under the influence of a conveyor system so that the plates will swing downwardly and out of the path of the moving shackle should the latter fail to pass through the plates.

Yet another object of the present invention is to provide a lifter of the aforementioned type which will return to a bird-removing position after swinging out of the path of a shackle failing to pass between the plates forming the lifter, whereby the lifter will be in a position to remove a bird from a succeeding shackle.

Other objects of the present invention will become apparent as the following specification progresses, reference being had to the accompanying drawings, wherein:

FIGURE 1 is a fragmentary, side elevational view of apparatus for automatically separating poultry from shackles made pursuant to our present invention;

FIG. 5 is an enlarged, fragmentary, plan view of one end of the lifter illustrating the pivotal means therefor; and FIG. 6 is a cross-sectional, side elevational view taken on line 6—6 of FIG. 5.

Figure 2:
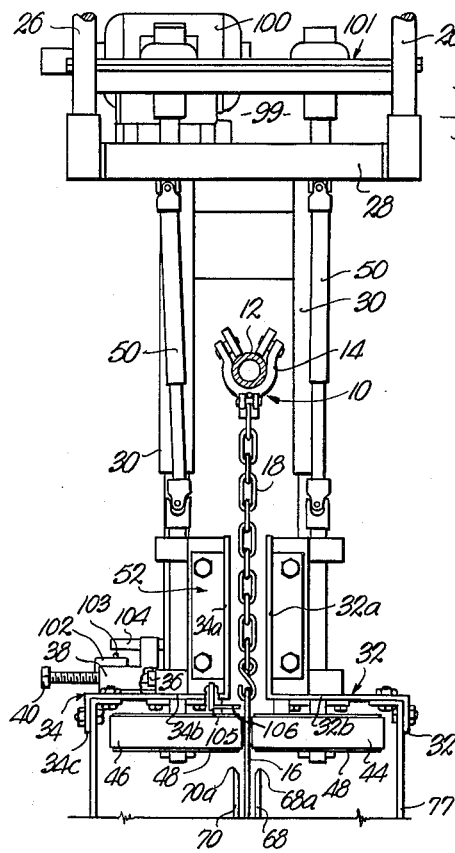
FIG. 2 is a view showing the outlet end thereof.
Figure 3:
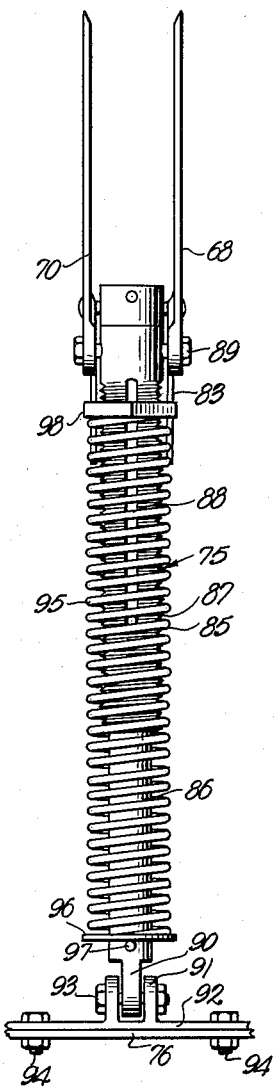
FIG. 3 is an enlarged, fragmentary, side elevational view of the telescoping tubes and compression spring around the tubes rendering the lifter of the present invention swingable downwardly relative to a horizontally advancing shackle.

It is quite common in poultry processing plants to provide an overhead conveyor 10 that includes a track 12 which supports a train of wheeled carriages 14 from each of which is suspended a shackle 16, as for example, through use of a chain 18. The carriages 14 may be interconnected by a chain 20 and may be driven by a power wheel 22 operably coupled with a prime mover such as an electric motor 24.

The machine about to be described and forming the subject matter of the instant invention has been designed for use in conjunction with the conveyor 10 and, therefore, as best seen in FIG. 2 of the drawings, it is disposed in straddling relationship to the track 10. A suggested support for the machine is in the nature of a plurality of suspension members 26 connected with a platform 28 from which depends a plurality of extensible hangers 30.

A pair of spaced Z-shaped members 32 and 34 are carried by the hangers 30 at the lowermost ends thereof, members 32 and 34 including upright plates 32a and 34a, horizontal plates 32b and 34b integral with and extending laterally outwardly from plates 32a and 34a, and downturned flanges 32c and 34c integral with the outermost, longitudinal edges of plates 32b and 34b. Plate 32b may be welded or otherwise affixed directly to the lowermost ends of its corresponding hangers 30.

It may be pointed out at this juncture that frame 42 (hereinafter more fully described), depending from the members 32 and 34, is sufficiently resilient to permit the adjustment just above set forth.

A pair of continuous belts 44 and 46 are carried beneath plates 32b and 34b respectively, by pulleys 48, two of which are driven by extensible shafts 50 having a number of universal joints therein as seen in FIGS. 1 and 2 to permit the adjustment between plates 32a and 34a as above described, and to permit operation of belt tightener assemblies 52 carried by plates 32a and 34a.

Belts 44 and 46 are so disposed that their innermost horizontal stretches are in close juxtaposition and in direct vertical alignment with and below the track 12 to permit the shackles 16 successively to move through the machine between the stretches as the chains 18 hang vertically from the carriages 14.

Members 32 and 34 have elongated guides 56 mounted thereon and bent at their outermost free ends to present an entrance mouth 58 for the shackles 16, the purpose whereof is to quiet the shackles 16 and remove all swinging and twisting thereof before the shackles 16 enter between the plates 32a and 34a and, therefore, between the innermost belt stretches in the manner and in the position illustrated for the shackles 16 in FIGS. 1 and 2 of the drawings.

The shackle 16 chosen for illustration is in the nature of a wire or rod frame 60, having bird-holding portions at the lower extremities thereof and shown to be in the nature of a plurality of upwardly facing notches 62, the centermost of which is normally used to permit suspension of the bird by its neck prior to removing its head. The two outermost notches 62 of the shackle 16 are, on the other hand, adapted to receive either the wings or the legs of the bird, and if the feet have been removed, the suspension is from the knee joint. However, insofar as the instant invention is concerned, it matters not how the bird is suspended from the shackle 16 and the operation of the machine is even effective when but one of the notches 62 is used to hang the bird from one of its wings or one of its legs.

The lifter or deflector which raises the bird carried by shackle 16, is best illustrated in FIGS. 3 to 6 inclusive of the drawings and is broadly designated by the numeral 66. It consists of a pair of spaced, elongated, substantially triangular plates 68 and 70 that are in parallelism with their transverse axes vertically disposed and which may be joined integrally by an arcuate bight 72.

The deflector or lifter 66 is supported immediately below the belts 44 and 46 by a pair of horizontally spaced, upright legs 74 and 75 which are in turn supported at the bight portions 76 of a pair of horizontally spaced, U-shaped brackets 77 constituting the frame 42. It is between plates 68 and 70 that the lower extremities of the shackles 16 below belts 44 and 46 pass during advancement of shackles 16 from mouth 58 to the outlet ends of members 32 and 34.

Plates 68 and 70 are provided with longitudinal, inclined edges 68a and 70a respectively, that serve as ramps and that slope downwardly as the mouth 58 is approached. Since edges 68a and 70a progressively increase in height in the direction of travel of shackle 16 and since the latter is prevented from shifting vertically by virtue of being held between belts 44 and 46, it is apparent that a bird carried by shackle 16 is raised out of the notches 62 thereof sufficiently to release the bird therefrom and permit the same to gravitate from lifter 66 as shackles 16 continue to advance by the joint operation of conveyor 10 and belts 44 and 46 which grip the upper extremities of frame 60.

Leg 74 is provided with a flange 78 at the normally lowermost end thereof rigidly secured to the bight portion 76 of the proximal bracket 77 by nut and bolt means 79. A notch 80 is diametrically disposed in leg 74 at the uppermost end thereof for receiving therein an elongated pin 81 which passes through plates 68 and 70, thus providing a horizontal axis for swingably mounting the plates on leg 74. A screw 82 in leg 74 overlies pin 81 to fixedly position the same within notch 80. A U-shaped skirt 83 is rigidly secured at the sides thereof to plates 68 and 70 at the lowermost edges of the innermost faces thereof. Skirt 83 serves as a guide and stop means for lifter 66, since the bight 84 of skirt 83 surrounds the uppermost end of leg 74 and limits the upward swingable movement of lifter 66.

Leg 75 includes a pair of elongated, cylindrical, relatively shiftable elements 85 and 86, element 85 being tubular for telescopically receiving therein the normally uppermost end of element 86 and externally threaded for a purpose hereinafter described. A pin-like projection 87 extends laterally from element 86 and into an elongated slot 88 in element 85 to limit the travel of element 86 within element 85, the ends of slot 88 serving as stops for projection 87.

The uppermost end of element 85 is pivotally secured between plates 68 and 70 by means of nut and bolt means 89 to permit element 85 to rotate about the horizontal axis of bolt means 89.

The lowermost end of element 86 is reduced in transverse cross section to provide a perforated tip 90 disposed between a pair of ears 91 secured to a plate 92 in any suitable manner, such as by welding, tip 90 being pivotally secured to ears 91 by nut and bolt means 93 and plate 92 being secured to the bight portion 76 of the proximal bracket 77 by nut and bolt means 94.

A coil spring 95 surrounds elements 85 and 86 and is supported at the normally lowermost end thereof on a disc 96 engaging a pin 97 to limit the downward travel of disc 96. The uppermost end of spring 95 is normally in engagement with a nut 98 threadably mounted on element 85 and reciprocable therealong. The compression of spring 95 is thereby varied by shifting nut 98 relative to element 85.

Figure 4:
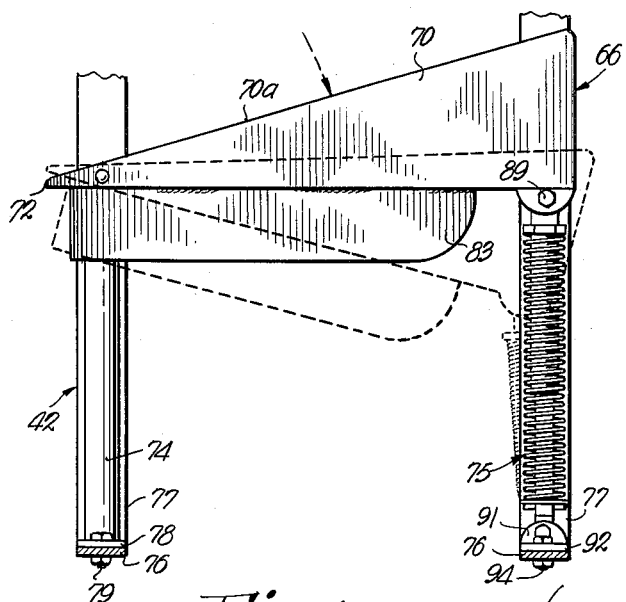
FIG. 4 is a fragmentary, cross-sectional, side elevational view of the lifter forming a part of the instant apparatus.

By virtue of the aforesaid construction, lifter 66 may swing downwardly to the dashed line position shown in FIG. 4 until projection 87 engages the element 85 at the uppermost end of slot 88. Leg 75 is permitted to rotate slightly about the axis through nut and bolt means 93 since the uppermost end of element 85 and the lowermost end of element 86, is pivotally mounted on adjacent structure.

The shafts 50 and, therefore, the belts 44 and 46, are driven by power means 99 carried by platform 28 and including a prime mover such as an electric motor 100. A suitable reduction gearing unit or assembly, broadly designated by the numeral 101, is interposed between the motor 100 and the two driven shafts 50.

It is now manifest that the two prime movers 24 and 100 must be synchronized so that the carriages 14 are advanced along the track 12 at the same rate of speed as the shackles 16 are motivated by the continuously operating belts 44 and 46. If this relationship between the speeds of travel of the carriages 14 and the shackles 16 is interrupted, difficulties are obviously experienced to the point of breakage of, or damage to the components of the conveyor 10, or the bird-removing machine of the instant invention.

Consequently, there is provided a safety control that includes an electric switch 102 carried by the plate 34b and best illustrated in FIG. 2. Spring-loaded control button 103 is disposed in alignment with and below one end of a swingable lever 104 that is likewise carried by the plate 34b. The opposite or innermost end of the lever 104 is pivotally connected to a vertically reciprocable rod 105 adjacent the outer face of the plate 34a. Rod 105 extends downwardly through the plate 34b and has a laterally extending actuator 106 affixed to the lowermost end thereof and directly overlying the belt 46.

The switch 102 is operably coupled with the prime mover 24 and/or the prime mover 100 such that downward actuation of the button 103 of switch 102, de-energizes either or both of the prime movers 24 and 100. The circuitry between switch 102 and the prime movers 24 and 100, may be quite conventional and is, therefore, obviously not illustrated. Any upward deflection of the inner stretch of belt 46, out of its normal horizontal disposition, sufficient to cause the stretch to engage the actuator 106 and raise the rod 105, swings the lever 104 so that the latter in turn actuates the control button 103 for switch 102.

If, therefore, for example, the motor 100 stops, the tendency for carriages 14 to continue to move along track 12 under the power of motor 24, will result in an upward component on shackles 16 between the belts 44 and 46. As such shackles 16 move upwardly while being gripped between the inner stretches of belts 44 and 46, the stretch of belt 46 will deflect sufficiently to raise the actuator 106, and, of course, this de-energizes motor 24 before damage can occur. If the switch 102 is also operably coupled with the motor 100, it can be de-energized in the same manner if, for some reason or other, the carriages 14 do not continue to advance. In this instance, the tendency of the belts 44 and 46 to advance the shackles 16 while carriages 14 are stationary, or moving too slowly, will likewise deflect the stretch of belt 46 sufficiently to open switch 102 and deenergize motor 100.

It is important to note that edges 68a and 70a are equally capable of removing the birds from the holding portions of the shackles, depending upon the position of the shackles and birds as they enter the mouth 58. The bird normally hangs from one side of the shackle and one of the plates becomes a divider between the bird and the lower extremities of the shackle 16. If, on the other hand, the shackle 16 is turned oppositely at the time it enters the mouth 58, the bird will slide along the outer face of the plate, whereupon the corresponding edge becomes the primary factor in raising the bird out of the notches 62 during the time that the bird slides upwardly along the edge. In any event, the two edges 68a and 70a oftentimes cooperate in raising the bird if parts thereof extend through the shackle 16 sufficiently to engage both of the edges 68a and 70a.

If, for any reason, a shackle 16 does not pass between the plates 68 and 70, but passes around one of the latter, shackle 16 will slidably engage the said one plate and force the latter to swing downwardly after overcoming the compressive force of spring 95. After shackle 16 has passed lifter 66, plates 68 and 70 will swing upwardly under the influence of spring 95 to the original position illustrated in FIG. 1 to receive therebetween a succeeding, properly aligned shackle 16. By permitting lifter 66 to be swingable in the aforesaid manner, shackle 16 is prevented from being bent as the same engages either of the plates 68 and 70 since the innermost stretches of belts 44 and 46 prevent any lateral movement of shackle 16 and the material forming lifter 66 is more resistant to bending than the material forming shackle 16.

Suspension as a means of supporting the machine in proper relationship to the conveyor 10, is illustrated to show how it is possible to rapidly and continually drop the birds into any suitable receiver beneath the framework 42. Hence, by way of example, the birds may be discharged directly into a chilling tank and such successive step in the over-all operation, commenced immediately, all without operator attention insofar as transferring the birds from the conveyor 10 to the chiller is concerned.

Having thus described the invention, what is claimed as new and desired to be secured by Letters Patent is:

1. In structure for removing a bird carried by a poultry shackle suspended from, and advanced in a predetermined direction along a normal path of travel by an overhead conveyor, said structure comprising a support; a lifter adapted for engaging and lifting a bird out of the shackle as the latter is advanced; and means coupled with said support and said lifter for shiftably mounting the latter on said support for movement from a position adjacent to said normal path to a position substantially clearing the shackle when the shackle advances along a path spaced from said normal path and engages the lifter, whereby the shackle is permitted to pass the lifter in an undamaged condition while the plate is in said clearing position.

2. In structure as set forth in claim 1, wherein is provided means on said support for returning the lifter to the normal position thereof when the shackle has become disengaged therefrom.

3. In structure for removing a bird carried by a poultry shackle suspended from, and advanced in a predetermined direction along a normal path of travel by an overhead conveyor, said structure comprising a support; a plate provided with an inclined edge adapted to engage a bird and lift the same out of the shackle as the latter is advanced; and means coupled with said support and said plate for pivotally mounting the latter on said support for movement from a position adjacent to the normal path of travel of the shackle to a position substantially clearing the shackle when the latter advances along a path spaced from said normal path and engages the plate, whereby the shackle is permitted to pass the plate in an undamaged condition when the plate is in said clearing position.

4. In structure as set forth in claim 3, wherein said support includes a pair of horizontally spaced, upright legs secured at the normally uppermost ends thereof to said plate, one of said legs adapted to be rigidly secured at the lowermost end thereof to a base, and the other of said legs adapted to be rotatably mounted at the lowermost end thereof to said base.

5. In structure as set forth in claim 4, wherein said plate is swingably mounted on said one leg for rotational movement in a vertical plane and is pivotally mounted to the uppermost end of the other leg to permit the latter to tilt when said plate is swung.

6. In structure as set forth in claim 5, wherein said other leg includes a pair of relatively shiftable elements, one of said elements being tubular and telescopically receiving therein the other of said elements, and wherein is included bias means on said elements for returning the plate to the position thereof adjacent to said normal path when said shackle is disengaged therefrom.

7. In structure as set forth in claim 6, wherein said bias means includes an elongated coil spring in surrounding relationship to said elements, said one element being externally threaded, and wherein is included a nut threadably mounted on said one element for reciprocation relative thereto, said spring being disposed between said nut and the lowermost end of said other element, and stop means on said elements for limiting the relative movement thereof.

8. In structure as set forth in claim 7, wherein said one element is provided with an elongated slot therein intermediate the ends thereof, said stop means including a projection on said other element and extending through said slot.

References Cited in the file of this patent
UNITED STATES PATENTS

| | | |
|---|---|---|
| 1,760,392 | Arminger | May 27, 1930 |
| 2,846,717 | Patterson et al. | Aug. 12, 1958 |
| 2,846,718 | Sengelaub et al. | Aug. 12, 1958 |
| 2,852,805 | Corey et al. | Sept. 23, 1958 |